United States Patent Office 2,967,252
Patented Jan. 3, 1961

2,967,252

SYSTEM FOR SUPPLYING CONTROLLED FREQUENCY POWER

Richard F. Blake, Mountain Lakes, N.J., assignor to Specialties Development Corporation, Belleville, N.J., a corporation of New Jersey Filed Aug. 4, 1958, Ser. No. 752,767

16 Claims. (Cl. 307—151)

The present invention relates to power supply systems, and, more particularly, to power supply systems of the type including a secondary frequency source by means of which the frequency of the power supplied is controlled.

In many applications, there is a need for an efficient reliable economical and light weight power supply which will provide a controlled frequency, for example, in modern military aircraft, where it is essential that electrical power of constant frequency and voltage be supplied to precisely operate electronic equipment. Since it is essential that the weight of the electrical power supply system be kept to a minimum, it is common practice to use, as a source of electrical power, an alternating current generator driven by the aircraft's propulsive engine. The speed of this engine, however, is not constant throughout the various phases of flight (i.e. takeoff, cruise, top speed dash, and letdown). Therefore, if the generator is driven directly from the engine, the speed of rotation of the generator will vary with engine speed, and the output of the generator will vary in voltage and frequency.

Since a three phase electrical system requires less copper to transmit a given amount of power than a system having any other number of phases, it is desirable that the power supply have a three phase output in addition to constant frequency and voltage. One type of device currently used to provide three phase electrical energy at a constant frequency and voltage is a constant output speed transmission which is placed between the aircraft's engine and a three phase generator to maintain the speed of rotation of the generator constant. Devices of this type, however, have inherent disadvantages in that they are relatively heavy and expensive.

Other devices, which have been designed to provide three phase, constant frequency power, require additional electrical machinery and therefore are also relatively heavy and expensive.

It has been proposed that a lighter and more economical three phase constant frequency power supply may be provided by amplitude modulating the output of each phase of a directly driven three phase generator with a signal having a constant frequency equal to the desired output frequency, rectifying the amplitude modulated wave form, reversing the polarity of every second half cycle, and filtering out the original generator frequency. In systems of this type, a good portion of the power available at the generator is prevented from appearing at the output due to the amplitude modulation and the rectification. It may be seen therefore, that for any desired power output of a system, the generator must be capable of producing substantially greater power. As a result, a heavier generator must be used with this type of system than with an uncontrolled system having the same output power.

Accordingly, an object of the present invention is to provide a power supply system in which the output of a power source is modified in frequency to provide a controlled frequency power output.

Another object is to provide a controlled output frequency power supply system in which substantially all of the power available at the output of a power source appears as usable power at the power supply output.

Another object is to provide a constant frequency power supply system including a variable frequency power source in which substantially all of the power available at the output of the power source appears as usable power at the power supply output.

Another object is to provide a highly efficient system for converting power at one frequency into power at a different frequency.

A further object is to provide a light weight system to accomplish the foregoing in a simple, practical and economical manner.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects are generally accomplished by providing, in connection with a source of alternating current power, a controlled frequency source, for example, powered by energy produced by the power source; and means connected to the power source and to the controlled frequency source for producing single frequency power at a side band frequency of the power source frequency, for example, including switch modulation means.

A preferred embodiment of the invention has been chosen for purposes of illustration and description, and is shown in the accompanying drawings, forming a part of the specification, wherein.

Figure 1:
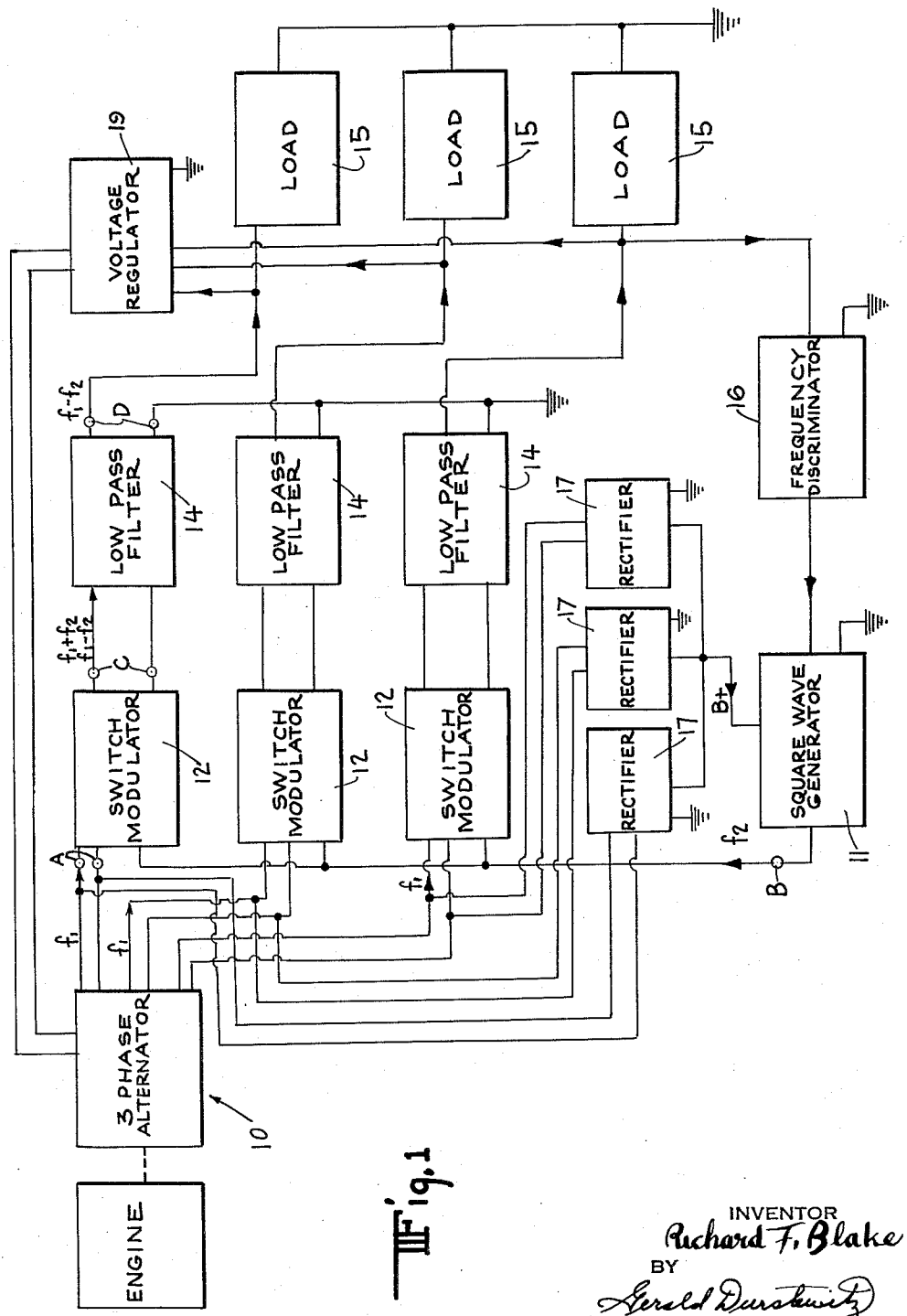
Fig. 1 is a block diagram of a controlled frequency power supply system in accordance with the present invention.

Referring to Fig. 1 of the drawings in detail, there is shown a controlled frequency power supply in accordance with the present invention which generally comprises a three phase six wire alternator 10 directly driven by a variable speed engine, a square wave generator 11, three switch modulators 12 each connected to the output of one of the three phases of the alternator and to the square wave generator, and three low pass filters 14 each connected to one of the switch modulator outputs. The output of each low pass filter 14 is connected to a load 15 and the output of one of these filters is also connected to a frequency discriminator 16. The square wave generator 11 is connected to the frequency discriminator 16 and receives direct current power from three rectifiers 17 which are each connected to one of the alternator outputs. A voltage regulator 19 is connected to each of the low pass filter outputs and to the field winding (not shown) of the alternator.

Figure 2:
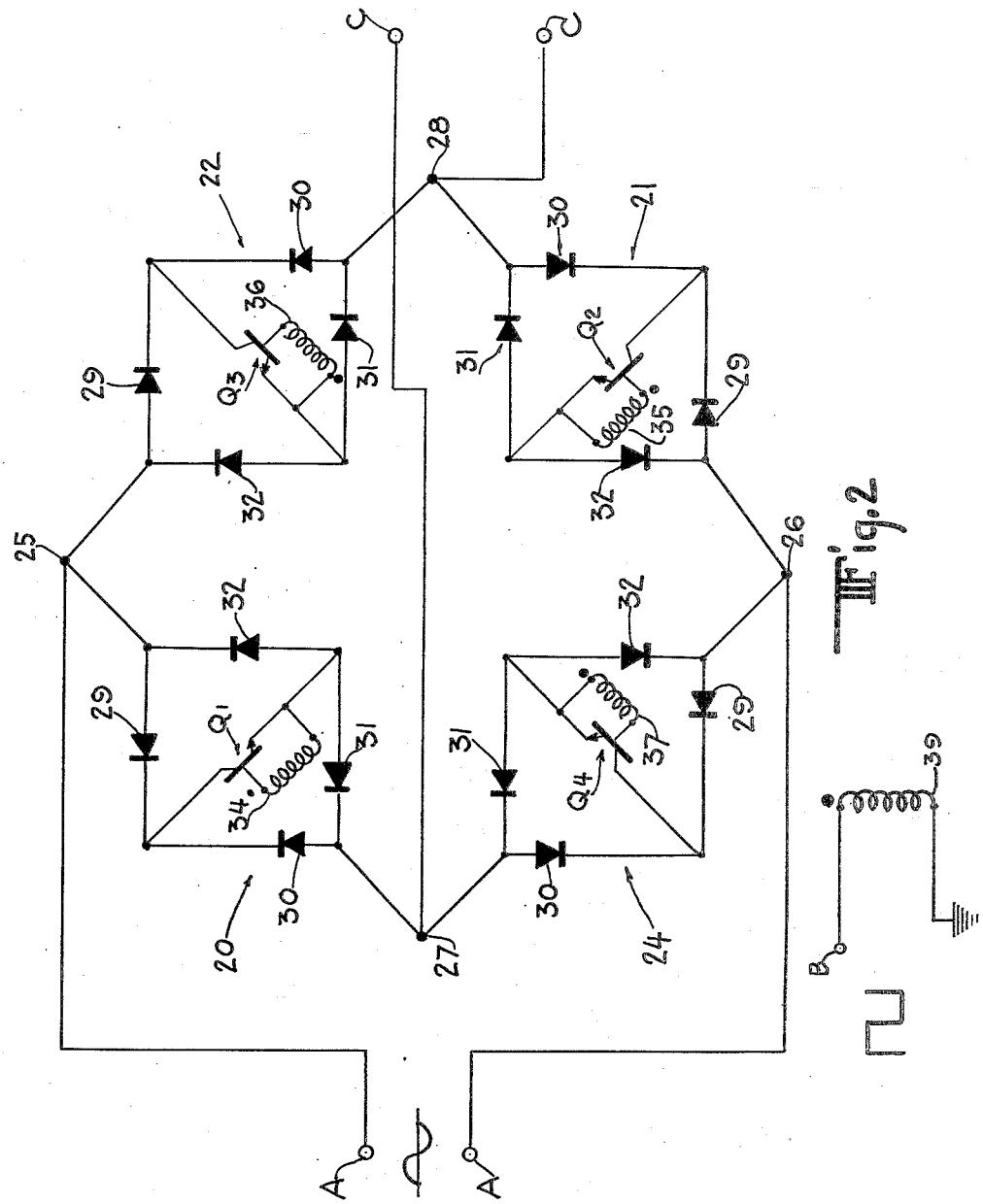
Fig. 2 is a circuit diagram of a portion of the system shown in Fig. 1.

The switch modulators 12 are identical, one of them being shown in Fig. 2, which comprises four rectifying bridges 20, 21, 22 and 24 connected together to form a bridge having input terminals 25 and 26 for connection to the alternator 10 and having output terminals 27 and 28 for connection to the low pass filters 14. Each of the rectifying bridges 20, 21, 22 and 24 includes four diodes 29, 30, 31 and 32, and across each of the bridges, NPN power transistors Q1, Q2, Q3 and Q4 are respectively connected, each transistor having its collector connected to the junction of the diodes 29 and 30, and its emitter connected to the junction of the diodes 31 and 32. Inductances 34, 35, 36 and 37 are connected respectively between the base and the emitter of each of the transistors Q1, Q2, Q3, and Q4 and are inductively coupled to an inductance 39 which is connected to the output of the square wave generator 11. The inductances are so arranged that, when the dot end of inductance 39 is positive, the voltages induced in inductances 34, 35, 36 and 37 cause the dot ends of these inductances also to be positive.

In operation, the alternator 10 has an output frequency $f_1$ which varies in accordance with the speed of the driving engine, and the square wave generator 11 produces a frequency $f_2$ which is varied by the frequency discriminator 16, as described hereinafter, to provide a constant frequency output current in the loads 15.

For the purpose of explanation, it is assumed that 400 cycle per second current is to be delivered to the loads and the alternator frequency $f_1$ at a particular moment is 3000 cycles per second. The square wave generator frequency $f_2$ at this moment is then 3400 cycles per second, and the waveforms of the outputs of one phase of the alternator and of the square wave generator, as they appear at points A and B in Figs. 1 and 2, are shown as waveforms A and B in Fig. 3, respectively.

As shown in Fig. 2, the alternator output is impressed across the input terminals 25 and 26 of the switch modulator and the square wave generator output is passed through the inductance 39. It will be seen that the transistors Q1 and Q2 can conduct when the square wave generator output (waveform B) is in its positive half cycle and transistors Q3 and Q4 can conduct when this output is in its negative half cycle. It will also be seen that when the alternator output (waveform A) is in its positive half cycle current will flow from terminal 25 through one of the bridges 20 or 22, through the filter and the load, and through one of the bridges 21 or 24 to the terminal 26. Likewise, current will flow in a similar manner from the terminal 26 to the terminal 25 when the alternator output is in its negative half cycle.

To more fully describe the operation of the switch modulator, its action during one complete cycle of the waveform A will now be analyzed. During time $t_0$ to $t_1$ (indicated in Fig. 3) when both waveforms are in their positive half cycles, the transistors Q1 and Q2 are conducting and the terminal 25 is positive with respect to the terminal 26, therefore, current flows from the terminal 25 through the bridge 20 (diode 29, transistor Q1, and diode 31) to the terminal 27, through the filter and load to the terminal 28, and through the bridge 21 (diode 30, transistor Q2, and diode 32) to the terminal 26. At time $t_1$ while the waveform A is still positive, the waveform B starts its negative half cycle placing the transistors Q3 and Q4 in conduction. Therefore, during time $t_1$ to $t_2$, current flows from the terminal 25 through the bridge 22 (diode 29, transistor Q3, diode 31) and the load to the terminal 27, and through the bridge 24 (diode 30, transistor Q4, diode 32) to terminal 26. The waveform A starts its negative half cycle at time $t_2$, therefore from time $t_2$ to $t_3$, while the transistors Q3 and Q4 are still conducting, the terminal 25 is negative with respect to the terminal 26 and current flows from the terminal 26 through the bridge 24 to the terminal 27, through the filter and the load to the terminal 28, and through the bridge 22 to the terminal 25. At time $t_3$, the waveform B starts its second positive half cycle and therefore in the final portion of the first cycle of the waveform A (time $t_3$ to $t_4$), the terminal 25 is still negative with respect to the terminal 26 and the transistors Q1 and Q2 are conducting. Current then flows from the terminal 26 through the bridge 21 to the terminal 28, through the filter and the load to the terminal 27, and through the bridge 20 to the terminal 25.

From the above analyses, it will be seen that the modulator at all times provides a low resistance current path between its input terminals 25 and 26 and its output terminals 27 and 28, whereby substantially all of the electrical energy available at the alternator is passed through the modulator.

Figure 3:
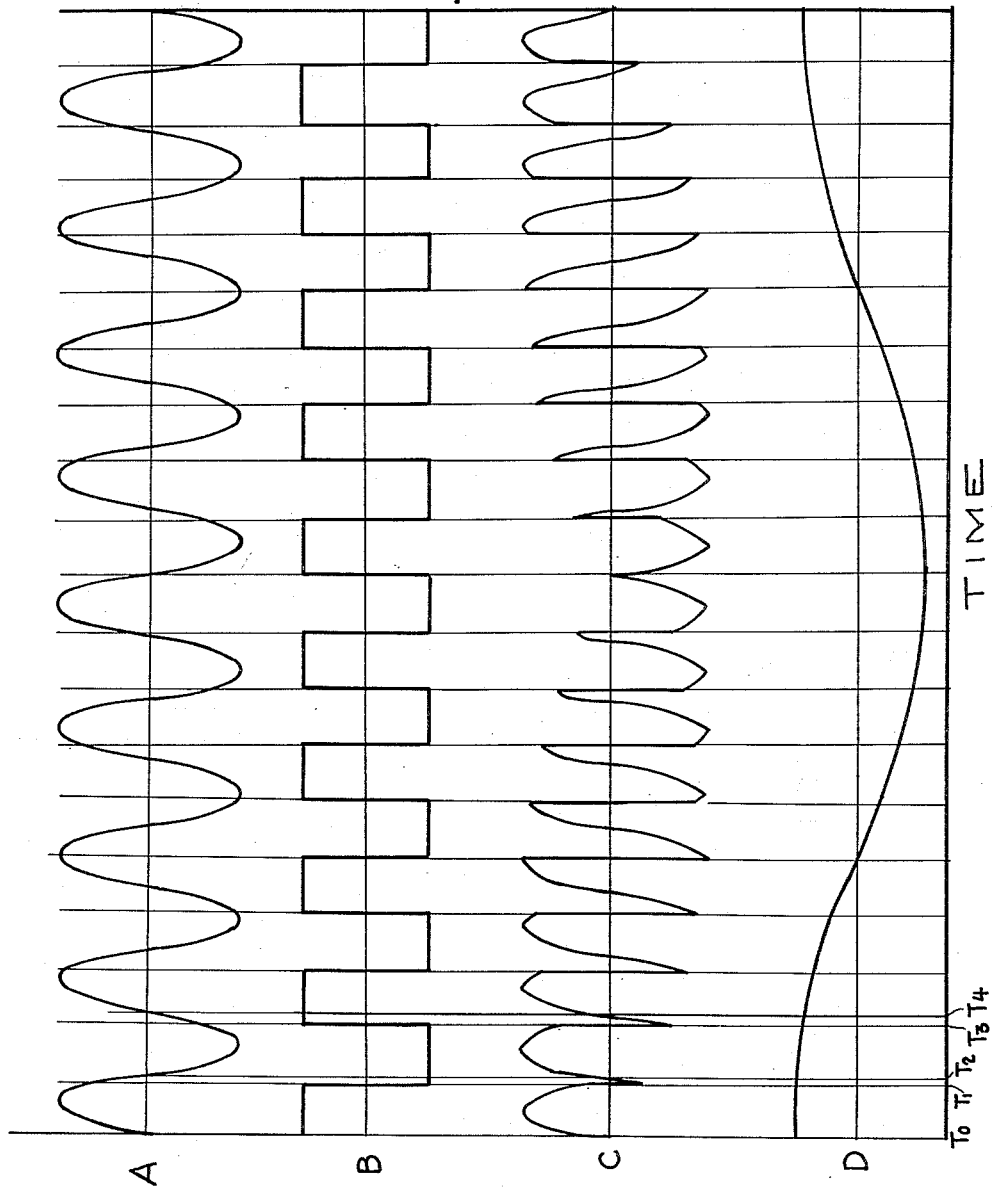
Fig. 3 is a plot of the waveforms at the points A, B, C, and D in Figs. 1 and 2.

The waveforms of the modulator output, as it appears at points C in Figs. 1 and 2, is shown in Fig. 3 as the waveform C. This waveform has two frequency components, one equal to the sum of the frequencies of the waveforms A and B and the other equal to the difference of the frequencies of the waveforms A and B. These sum and difference frequencies will be referred to hereinafter and in the claims as the side band frequencies of the alternator output frequency $f_1$.

If, as assumed, the alternator frequency $f_1$ is 3000 cycles per second and the square wave generator frequency $f_2$ is 3,400 cycles per second, then the waveform C contains an upper side band frequency $(f_1+f_2)$ of 6,400 cycles per second and a lower side band frequency $(f_1-f_2)$ of 400 cycles per second. The low pass filter 14 smooths out the high frequency variations producing a 400 cycle per second output (shown as the waveform D in Fig. 3) which flows through the load 15. Each of the outputs of the other two phases of the alternator are similarly treated and the three resulting 400 cycle currents supplied to the loads 15 have the same phase relationship as the three alternator outputs.

As the speed of the driving engine varies, the frequency and voltage of each of the alternator outputs also varies thereby causing similar variations in the lower side band frequency power supplied to each of the loads 15. The voltage regulator immediately senses any output voltage changes and adjusts the excitation of the alternator so that the voltage at the output of the filters 14 remains constant.

The constant voltage filter output is sampled by the frequency discriminator which senses any changes in frequency and continually adjusts the square wave generator so that its frequency is always 400 cycles per second above the alternator output frequency. For example, if the alternator output frequency increases from 3000 cycles per second to 3010 cycles per second, the frequency discriminator causes the square wave generator frequency to increase from 3400 cycles per second to 3410 cycles per second. Current having a constant lower side band frequency of 400 cycles per second is thereby supplied to each of the loads 15.

To accomplish this function, the frequency discriminator 16 may include an "$m$" derived filter connected to the output of one of the filters 14, a full wave rectifier connected to the output of the "$m$" derived filter, and a smoothing filter connected to the output of the full wave rectifier. The "$m$" derived filter has an output voltage which is proportional to the input frequency and therefore the smoothing filter produces a D.C. voltage which is proportional to the frequency at the input of the "$m$" derived filter. This D.C. voltage is then applied as bias to the square wave generator which may be a multivibrator. Since the frequency of a multivibrator is dependent upon bias voltage, the frequency of the square wave generated will vary as the input frequency of the "$m$" derived filter varies. If the components used are chosen such that a small change in the input frequency to the "$m$" derived filter produces a great change in the frequency of the square wave generator, then the alternator frequency may vary widely with only a slight variation in the frequency of the output of the filters 14. For example, if the bias produced by a frequency of 399 cycles per second at the input of the discriminator causes the square wave generator to produce a frequency of 3400 cycles, and the bias produced by a discriminator input frequency of 401 cycles per second causes the square wave generator to produce a frequency of 6,400 cycles, then the alternator output frequency may vary from 3,001 cycles per second to 5,999 cycles per second with only a 2 cycle per second variation in the frequency at the output of the filters 14.

To provide B+ power for the square wave generator, a portion of each of the alternator outputs is full wave rectified in the rectifiers 17, and the outputs of the rectifiers, which are out of phase, are connected in parallel to provide a relatively smooth D.C. voltage. In this manner, smooth B+ power is provided using the minimum number of components. This B+ power could also be obtained by taking a portion of the modulator output and passing it through a high pass filter before rectifying it.

With currently available transistors, each switch modulator can handle a current of 29 amperes at an output voltage of 115 volts. Therefore, the three phase system shown can provide 10 kilovolt-amperes to the loads 15. All the power available at the generator is delivered to the loads except for a small amount of power consumed by the square wave generator, the voltage regulator, the frequency discriminator, and the voltage drop across the modulators. Therefore, to supply 10 kilovolt-amperes to the loads, the alternator need be only slightly larger than an alternator which will supply an uncontrolled 10 kilovolt-ampere output.

From the foregoing description, it will be seen that the present invention provides a light weight power supply system in which the output of a power source is modified in frequency in a simple, practical, efficient and economical manner to provide a controlled frequency power supply output.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. A system for supplying controlled frequency power comprising means for converting mechanical power into electrical power having a first frequency, a controlled frequency signal source having a second frequency and powered by electrical energy produced by said power converting means, means connected to said power converting means and said controlled frequency source and powered by the controlled frequency signal for producing substantially single frequency system output power at a side band frequency of the first frequency, and controlled means connected to said controlled frequency source to vary the frequency of said controlled source to control the frequency of the output power of said second mentioned means.

2. A system for supplying controlled frequency power comprising means for converting mechanical power into electrical power having a first frequency, a controlled frequency rectangular wave signal source producing power having a second frequency, means for producing substantially single frequency system output power at a side band frequency of the first frequency including switch modulation means having input circuits connected to said power converting means and to said controlled frequency source, and controlling means connected to said controlled frequency source to vary the frequency of said controlled source to control the frequency of the output power of said second mentioned means.

3. A system for supplying controlled frequency power comprising means for converting mechanical power into alternating current electrical power, a controlled frequency rectangular wave signal source, a balanced switch modulator connected to the electrical output of said converting means and to said controlled frequency source and producing system output power at only the side band frequencies of the frequency of the alternating current produced by said converting means, means connected to said modulator for removing all but one side band frequency from the output power, and controlling means connected to said controlled frequency source to vary the frequency of said controlled source to control the frequency of the output power.

4. A system for supplying controlled frequency power comprising means for converting variable speed mechanical power into variable frequency electrical power, a controlled frequency rectangular wave signal source powered by electrical energy produced by said converting means, means connected to the electrical output of said converting means and to said controlled frequency source for producing substantially single frequency system output power, and controlling means responsive to variations in the frequency of the output power and connected to said controlled frequency source to vary the frequency of said controlled source to maintain the frequency of the output power substantially constant.

5. A system for supplying controlled frequency power comprising means for converting variable speed mechanical power to variable frequency electrical power, a controlled frequency rectangular wave signal source, means for producing substantially single frequency system output power at a side band frequency of the electrical output of said converting means including switch modulation means having input circuits connected to the electrical output of said converting means and said controlled frequency source, and controlling means responsive to variations in the frequency of the output power and connected to said controlled frequency source to maintain the frequency of the output power substantially constant.

6. A system for supplying controlled frequency power comprising means for converting variable speed mechanical power to variable frequency electrical power, a controlled frequency rectangular wave signal source, a balanced switch modulator connected to the electrical output of said converting means and to said controlled frequency source and producing system output power at only the side band frequencies of the variable frequency, means connected to said modulator for selecting one side band frequency, and controlling means responsive to the frequency of the output power and connected to said controlled frequency source to vary the frequency of said controlled source in a manner to maintain the selected side band frequency constant.

7. A system for converting electrical power produced from mechanical power by an alternating current generator into power of a different frequency comprising in combination a controlled frequency rectangular wave signal source powered by energy produced by the generator, and means having an input for connection to the generator and an input connected to said controlled frequency source for producing system output power at a side band frequency of the generator frequency.

8. A system for converting electrical power produced from mechanical power by an alternating current generator into power of a different frequency comprising in combination a controlled frequency rectangular wave signal source, and means for producing substantially single frequency system output power at a side band frequency of the generator frequency including switch modulation means having an input circuit for connection to the generator and an input circuit connected to said controlled frequency source.

9. A system for converting electrical power produced from mechanical power by an alternating current generator into power of a different frequency comprising in combination a controlled frequency rectangular wave signal source, a balanced switch modulator having an input for connection to the generator and connected to said controlled frequency source for producing system output power at only the side band frequencies of the generator frequency, and means connected to the output of said modulator for removing all but one side band frequency from the output power.

10. A system according to claim 7, including controlling means connected to said controlled frequency source to vary the frequency of said controlled frequency source to control the frequency of the system output power.

11. A system according to claim 10, wherein said controlling means is responsive to the frequency of the output power and varies the frequency of said controlled source to maintain the frequency of the output power substantially constant.

12. A system according to claim 8, including controlling means responsive to the frequency of the output power connected to said controlled frequency source to vary the frequency of said controlled frequency source to maintain the frequency of the output power substantially constant.

13. A system according to claim 2, wherein first and second system output terminals are provided, said power converting means is provided with first and second output terminals alternating in polarity at the frequency of said power source, and said switch modulation means includes switching means for connecting said first power converting means terminal to said first system output terminal during one half cycle of the output of said rectangular wave source and for connecting said second power converting means terminal to said first system output terminal during another half cycle of the output of said rectangular wave signal.

14. A system according to claim 13, wherein said switching means includes switching devices controlled by said rectangular wave source for reversing the direction of the current flowing between said power converting means and said system output terminals each time the output of said rectangular wave source changes polarity.

15. A system according to claim 14, wherein said switching devices are semiconductor switching devices.

16. A system according to claim 3, wherein said power converting means produces a plurality of phases each having a separate output, said rectangular wave source produces a single phase output, and a switch modulator is connected to each phase output of said power source, each modulator being connected to be controlled by the single phase output of said rectangular wave source to provide plural phase system output power.

References Cited in the file of this patent

UNITED STATES PATENTS

| | | |
|---|---|---|
| 1,747,160 | Carpe | Feb. 18, 1930 |
| 2,298,930 | Decino | Oct. 13, 1942 |
| 2,562,943 | Pensyl | Aug. 7, 1951 |

UNITED STATES PATENT OFFICE
CERTIFICATE OF CORRECTION

Patent No. 2,967,252 January 3, 1961

Richard F. Blake

It is hereby certified that error appears in the above numbered patent requiring correction and that the said Letters Patent should read as corrected below.

Column 5, line 47, for "controlled" read -- controlling --.

Signed and sealed this 27th day of March 1962.

(SEAL)
Attest:

ERNEST W. SWIDER
Attesting Officer

DAVID L. LADD
Commissioner of Patents